Patented July 28, 1936

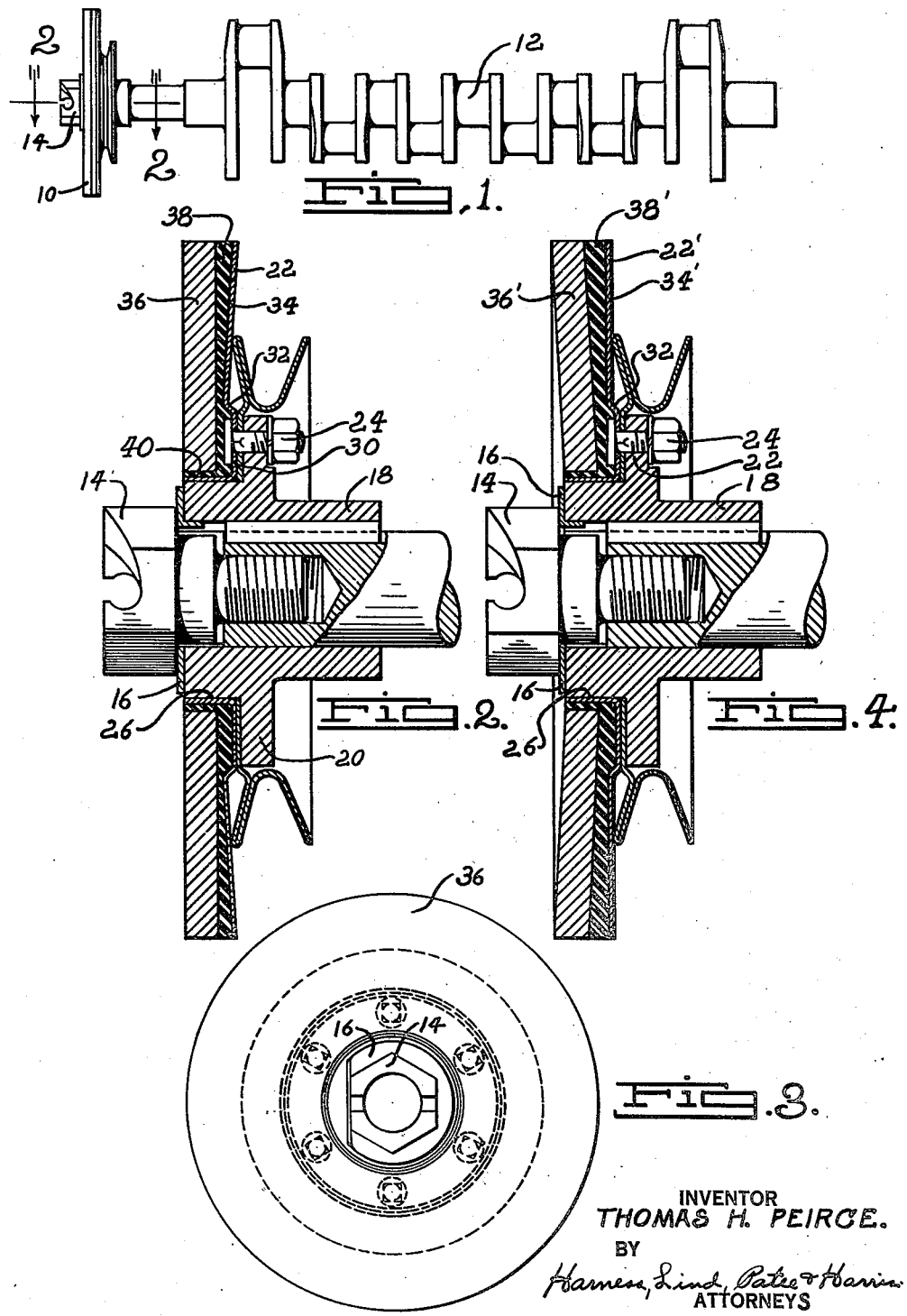

2,049,133

UNITED STATES PATENT OFFICE 2,049,133

VIBRATION DAMPER

Thomas H. Peirce, Detroit, Mich., assignor to Chrysler Corporation, Highland Park, Mich., a corporation of Delaware Application May 23, 1935, Serial No. 22,957

7 Claims. (Cl. 74—574)

This invention relates to torsional vibration dampers. More particularly the invention relates to a device of this character for dampening vibrations of crankshafts of internal combustion engines.

The main objects of the invention are to provide a vibration dampening device of the type which has an inertia member yieldably secured to the crankshaft and adapted for movement relative thereto; to provide a yieldable driving connection between the inertia member and crankshaft which will accommodate different amplitudes of movement of portions of the inertia member located at diverse distances from the crankshaft; to provide a yieldable driving connecting element for this purpose having adjacent portions which vary in yielding capacity in accordance with the variations in amplitude of movement to which related portions of the inertia member are subjected; and to provide a yieldable rubber driving element of this kind having parts which vary in thickness to correspond with the variations of the amplitude of movement of the portions of the inertia member with which it is associated.

A further object of the invention is to provide a rubber connecting element between the inertia member and the part of the structure by which it is driven which is so constructed and arranged that all portions of the rubber are substantially uniformly stressed during movement of the inertia member in operation.

Other objects and advantages of the invention will be more apparent from the following description taken in connection with the accompanying drawing, in which:

Fig. 1 is a side elevational view of a crankshaft equipped with a vibration damper embodying the invention.

Fig. 2 is a horizontal sectional view taken on the line 2—2 of Fig. 1.

Fig. 3 is a side elevational view showing the vibration damper as viewed from the left in Fig. 1.

Fig. 4 is a horizontal sectional view, similar to Fig. 2, but illustrating a modified form of the invention.

In the form of the invention shown in Figs. 1, 2 and 3, the vibration damper generally designated by the numeral 10, is mounted on the front end of a crankshaft 12, the latter having an axially extending threaded aperture in which a crank jaw 14 is screw threaded and retained by a lock nut 16. The vibration damper includes an inner hub 18, keyed to the front end of the shaft 12, and has a radially extending flange 20. A disc 22, preferably comprising sheet metal, is secured to the flange 20 by bolts 24, and is provided with a central opening and an axially extending flange 26. The disc 22 has an inner portion 30 adjacent the flange 26 disposed in a plane substantially perpendicular to the axis of the shaft 12, and it is provided with an off set part 32. The remaining outermost portion 34 of the disc 22 is disposed at a slight inclination with respect to the axis of the shaft 12.

An inertia member 36 comprising a metal disc having a substantially flat side face and a central aperture is positioned concentrically on the shaft 12 and in slightly spaced relationship with respect to the left side surface of the disc 22 as viewed in Fig. 2. The adjacent faces of the disc 22 and inertia member 36 converge in a direction toward the axis of the shaft 12.

The inertia member 36 is drivingly connected to the disc 22 by a yieldable element 38 preferably comprising rubber or other suitable resilient yieldable material. The connecting element 38 includes a substantially disc shaped body portion having a central aperture and an axially extending flange 40 which is disposed between the flange 26 of the disc 22 and the wall of the central aperture of the inertia member. The connecting element 38 is disposed in the space between the inertia member 36 and the disc 22 and has its opposite faces bonded by vulcanization or otherwise suitably secured to the adjacent faces of the disc and the inertia member, and the opposite surfaces of the flange 40 of the connecting element 38 may also if desired be bonded or otherwise suitably secured to the adjacent surfaces of the inertia member 36 and the flange 26 of the disc 22. As will be noted from Fig. 2, by having the face of the inertia member 36 adjacent the disc 22 substantially perpendicular to the axis of the shaft 12 and the disc 22 disposed at a slight inclination thereto, the space between the parts 22 and 36 gradually increases from a minimum width at the offset 32 to a maximum width at the outermost portion of the aforesaid parts, thus providing for the accommodation of a driving connection which varies correspondingly in thickness.

In the form of the invention shown in Fig. 4, the vibration damper illustrated is in most respects identical to that shown in Fig. 2 and like parts have been designated by the same numerals. In this form of the invention the vibration damper is provided with a disked shaped inertia member 36' having its convex surface disposed in slightly spaced relationship with respect to a sheet metal disc 22' which is secured to the hub structure 18 by bolts 24. The disc 22' has an outer substantially flat portion 34' which is disposed in a plane substantially normal to the axis of the vibration damper. A yieldable driving connecting element 38', preferably comprising rubber, is disposed in the space of tapering radial cross section between the convex side of the inertia member 36' and the disc 22'. The yieldable connecting element 38' is bonded by vulcanization or otherwise suitably secured to the adjacent side faces of the inertia member 36' and the disc 22'.

In a vibration damper constructed in accordance with the invention, the thickness of the rubber connecting element is so proportioned at diverse distances radially outwardly from the axis of the device as to accommodate the different amplitudes of movement of the radially spaced portions of the inertia member while subjecting all portions of the rubber connecting element to substantially the same stress. By virtue of this construction all portions of the rubber connecting element function in a similar manner and no one portion thereof is subjected to materially greater stress than another.

Failure of the bond between the rubber and the metal parts with which it is associated at localized areas thereof is guarded against and the resilient properties of the element remain constant during a prolonged operation of the device. This latter characteristic is particularly important in a vibration damper wherein the resilient properties of the rubber are relied upon to predetermine the periodicity of movement of the inertia member required to dampen torsional vibrations.

Although but several specific embodiments of the invention are herein shown and described, it will be understood that various changes in the size, shape and arrangement of parts may be made without departing from the spirit of the invention, and it is not my intention to limit its scope other than by the terms of the appended claims.

What I claim is:

1. In combination, an internal combustion engine crankshaft, a torsional crankshaft vibration damper therefor including a member non-rotatably secured to said shaft, an inertia member movable relative thereto, and a yieldable driving connection interposed between said members, said driving connection progressively increasing in yielding capacity from the portion thereof adjacent the axis of the damper outwardly and the yielding capacity of said connection being predetermined for each engine to absorb crankshaft vibrations characteristic of the engine to which the damper is applied.

2. In combination, an internal combustion engine crankshaft, a torsional crankshaft vibration damper therefor including a member non-rotatably secured to said shaft, an inertia member movable relative thereto, and a yieldable driving connection interposed between said members, said driving connection comprising a rubber element bonded to each of said members and increasing in thickness from the portion thereof adjacent the axis of said damper outwardly and the yielding capacity of said connection being predetermined for each engine to absorb crankshaft vibrations characteristic of the engine to which said damper is applied.

3. In combination, a crankshaft, a torsional vibration damper therefor including a member mounted on said crankshaft provided with two adjacent angularly disposed surfaces, a relatively rotatable inertia member concentrically disposed with respect to the axis of said crankshaft and having substantially corresponding angularly disposed surfaces, and means between the respective corresponding surfaces of said members yieldably connecting said members together consisting of a single yieldable disc element and a single yieldable laterally extending sleeve element, said sleeve element being of smaller diameter than said disc element and said disc element progressively increasing in yielding capacity from a minimum at one radial location to a maximum at another radial location.

4. In combination, a crankshaft, a torsional vibration damper therefor including a member mounted on said crankshaft provided with two adjacent angularly disposed surfaces, a relatively rotatable inertia member concentrically disposed with respect to the axis of said crankshaft and having substantially corresponding angularly disposed surfaces, and means between the respective corresponding surfaces of said members yieldably connecting said members together consisting of a single rubber member consisting of a single disc portion and a single laterally extending sleeve portion, said sleeve portion being of smaller diameter than said disc portion, and said disc portion progressively increasing in yielding capacity from a minimum at one radial location to a maximum at another radial location.

5. In combination, a crankshaft, a torsional vibration damper therefor including a member mounted on said crankshaft provided with two adjacent angularly disposed surfaces, a relatively rotatable inertia member concentrically disposed with respect to the axis of said crankshaft and having substantially corresponding angularly disposed surfaces, and means between the respective corresponding surfaces of said members yieldably connecting said members together consisting of a single rubber disc element and a single laterally extending rubber sleeve element, said sleeve element being of smaller diameter than said disc element and said disc element progressively increasing in thickness from a minimum at one radial location to a maximum at another radial location.

6. In combination, a crankshaft, a torsional vibration damper therefor including a member mounted on said crankshaft provided with two adjacent angularly disposed surfaces, a relatively rotatable inertia member concentrically disposed with respect to the axis of said crankshaft and having substantially corresponding angularly disposed surfaces, and means between the respective corresponding surfaces of said members yieldably connecting said members together consisting of a single rubber disc element and a single laterally extending rubber sleeve element, said sleeve element being of smaller diameter than said disc element and said disc element progressively increasing in thickness from a minimum at one radial location to a maximum at another radial location, said rubber elements being surface bonded to said corresponding surfaces of said members respectively.

7. In combination, a crankshaft, a torsional vibration damper therefor including a sheet metal member detachably secured to said crankshaft and provided with an outer disc portion and a single sleeve portion, said sleeve portion being of smaller diameter than said disc portion and being substantially concentric with the axis of said crankshaft, a relatively rotatable inertia member substantially concentrically disposed with respect to said crankshaft adjacent said first named member and having a substantially cylindrical surface spaced from and corresponding with said single sleeve portion and a substantially radial surface spaced from and corresponding with said disc portion, said disc portion of said first named member being angularly disposed with respect to said corresponding surface of said second named member so as to provide a space therebetween converging toward said crankshaft axis, and means between said disc and sleeve portions of said first named member and the corresponding surfaces of said second named member for yieldably connecting said members together consisting of a rubber disc element and a single laterally extending rubber sleeve element respectively, said rubber sleeve element being of smaller diameter than said rubber disc element and the latter progressively increasing in thickness from a minimum at a location adjacent said crankshaft to a maximum at a location remote therefrom, said rubber elements being bonded to the surfaces of said members between which they are disposed.

THOMAS H. PEIRCE.